United States Patent [19]

Kurzweg et al.

[11] Patent Number: 4,770,675
[45] Date of Patent: Sep. 13, 1988

[54] SYSTEM AND METHOD FOR SEPARATING GASES OF DIFFERING MASSES BY ENHANCED DIFFUSION PRODUCED BY TUNED OSCILLATIONS

[75] Inventors: Ulrich H. Kurzweg; Marc J. Jaeger, both of Gainesville, Fla.

[73] Assignee: University of Florida, Gainesville, Fla.

[21] Appl. No.: 2,268

[22] Filed: Jan. 12, 1987

[51] Int. Cl.$^4$ .................................. B01D 53/22
[52] U.S. Cl. .................................. 55/15; 55/17; 55/158
[58] Field of Search .................. 55/15–17, 55/158

[56] References Cited

U.S. PATENT DOCUMENTS

| 2,300,761 | 11/1942 | Amy | 55/15 |
| 2,964,124 | 12/1960 | Peierls et al. | 55/16 |
| 3,151,958 | 10/1964 | Bodine | 55/15 |
| 3,420,069 | 1/1969 | Booth | 55/16 X |
| 3,487,751 | 1/1970 | Meijer et al. | 55/16 X |
| 4,166,727 | 9/1979 | Paiva | 55/17 |
| 4,197,094 | 4/1980 | Eisenkraft | 55/17 |

FOREIGN PATENT DOCUMENTS

| 28316 | 4/1964 | German Democratic Rep. | |
| 54339 | 3/1967 | German Democratic Rep. | |
| 460795 | 2/1937 | United Kingdom | 55/15 |

OTHER PUBLICATIONS

E. J. Watson, "Diffusion in Oscillatory Pipe Flow", J. Fluid Mech. (1983), vol. 133, pp. 233–244.
M. J. Jaeger et al., "Determination of the Longitudinal Dispersion Coefficient in Flows Subjected to High--Frequency Oscillations", Phys. Fluids 26 (6), Jun. 1983, pp. 1380–1382.
C. H. Joshi et al., "An Experimental Study of Gas Exchange in Laminar Oscillatory Flow", J. Fluid Mech. (1983), vol. 133, pp. 245–254.
G. Dreyer et al., "Grundlagen und Anwendungen einer neuen Diffusionsmethode in Flüssiger Phase", Z. Naturforsch, vol. 23a, pp. 498–503 (1968).
G. Taylor, "Dispersion of Soluble Matter in Solvent Flowing Slowly Through a Hole", Proc. Roy, Soc., vol. H 219 (1983) pp. 186–203.
G. Hertz, "Über Trennung von Gasgemischen durch Diffusion in einem Strömenden Gase", Z. Phys. 19 (1923) pp. 35–42.
Maier, "The Separation of Gases by Diffusion", J. Chem. Phys., vol. 7, (1939) p. 854.

Primary Examiner—Robert Spitzer
Attorney, Agent, or Firm—Dennis P. Clarke

[57] ABSTRACT

A system for separating gases of differing masses by enhanced diffusion comprising a gas separating device which consists of a pair of gas reservoirs, at least one duct connecting the reservoirs and device for establishing oscillatory axial movement of gas within the duct. Each reservoir contains an inlet and outlet, the inlet being adapted for feeding a mixture of carrier gas and the mixture of gases to be separated and the inlet for the other reservoir being adapted for feeding a carrier gas into the other reservoir. One of the outlets is adapted for the withdrawal from one of the reservoirs of a mixture of carrier gas and a mixture of gases of differing masses which is enriched in the heavier gas component and the other outlet is adapted for withdrawal from the other of the reservoirs of a mixture of a carrier gas and a mixture of gases to be separated being enriched in the lighter gas component.

23 Claims, 5 Drawing Sheets

SYSTEM AND METHOD FOR SEPARATING GASES OF DIFFERING MASSES BY ENHANCED DIFFUSION PRODUCED BY TUNED OSCILLATIONS

BACKGROUND OF INVENTION

1. Field of the Invention

The present invention relates to a system and method for separating gases of differing masses by diffusion using tuned oscillations.

2. Prior Art

Paiva in U.S. Pat. No. 4,166,727 describes a method for separating gases of different masses by admitting a gas and the mixture of gases of different masses into one end of a duct so as to allow laminar flow of the admitted gases and collecting from the other end of the duct fractions of the mixture wherein the average relative concentration of one of the gases of different mass is higher than in the admitted mixture.

The differential diffusion method of Paiva suffers from several disadvantages. The patented method which attempts to increase separation rates in diffusion processes by using laminar axial convection in small diameter tubes working in conjunction with radial molecular diffusion requires switching devices for both the injection of gases into the system and for the removal of partially enriched and depleted mixtures.

Moreover, very long (about 10 meters) diffusion tubes are required by Paiva and the diffusion rates achieved are extremely low.

It is an object of the present invention to provide a differential diffusional method for separating gases of differing masses which are not subject to the above described disadvantages.

SUMMARY OF THE INVENTION

The foregoing and other objects are realized by the present invention, one embodiment of which is a system for separating gases of differing masses from a mixture thereof by enhanced diffusion comprising at least one gas separating device comprising:

a pair of gas reservoirs, each having gas inlet and outlet means;

at least one duct connecting the gas reservoirs; and means for establishing oscillatory axial movement of gas within the at least one duct;

one of the inlet means being adapted for feeding into one of the reservoirs a mixture of a carrier gas plus the mixture of gases of differing masses;

the other of the inlet means being adapted for feeding a carrier gas into the other of the reservoirs;

one of the outlet means being adapted for the withdrawal from one of the reservoirs a mixture of carrier gas and a mixture of gases of differing masses enriched in the heavier gas component; and the other of the outlet means being adapted for the withdrawal from the other of the reservoirs a mixture of carrier gas and a mixture of gases of differing masses enriched in the lighter gas component.

A further embodiment of the invention is a method for separating gases of differing masses from a gas mixture by enhanced diffusion comprising conducting at least one cycle of:

feeding a mixture of carrier gas plus the mixture of gases of differing masses into a gas reservoir which is connected by at least one duct to another gas reservoir;

feeding the carrier gas into the other gas reservoir;

establishing oscillatory axial movement of gas within the at least one duct;

withdrawing from one of the gas reservoirs a mixture of carrier gas and a gas mixture of differing masses enriched in the heavier gas component thereof; and withdrawing from the other of the reservoirs a mixture of carrier gas and a mixture of gases of differing masses enriched in the lighter component thereof.

PRIOR ART STATEMENT

The following prior art is noted in conformance with the provisions of 37 CFR 1.97 and 1.98.

Paiva, U.S. Pat. No. 4,166,727 is described above.

Watson, J. Fluid Mech. Vol. 133, P. 233 (1983); Jaeger et al, Phys. Fluids, Vol. 26, p. 1380 (1983) examine the general problem of the enhanced dispersion of a contaminant in a carrier fluid when the mixture is oscillated axially within a tube in the presence of an axial concentration gradient. The publication presents an analytical study without experiments. Joshi et al, J. Fluid Mech., Vol. 133, p. 245 (1983) verify Watson's predictions of enhanced gas dispersion by noting the experimental enhanced dispersion of methane gas in air.

It is important to realize that neither of the papers recognized that oscillations can be used for gas separation at high differential diffusion rates. The authors viewed the process as one of enhanced gas mixing.

Dreyer et al, Naturforsch, Vol. 23a, p. 498 (1968) examines the separation of liquid mixtures using low frequency oscillations (less than 1 Hz) of the fluid between parallel plates and pipes in the presence of a superimposed steady flow of water. The water is circulated through the system by an evaporation-condensation process. G. Dreyer and F. Lange hold a German patent, No. 54339 (1967) on this process. See also Lange et al, DWP No. 54339 and Lange et al, DWP No. 28316.

Taylor, Proc. Roy. Soc., Vol. H 219, p. 186 (1983), is an original paper on enhanced dispersion of contaminants in steady viscous pipe flow. The reference, for the first time, shows that a combination of axial convention and radial diffusion can greatly enhance axial disposition of contaminants in liquids.

Hertz, Z. Physik, Vol. 19, p. 35 (1923); Lange et al, Z. Naturwiss, Vol. 39, p. 765 (1930) and Maier, J. Chem. Phys., Vol. 7, p. 854 (1939) disclose molecular diffusion methods to separate isotopes.

DETAILED DESCRIPTION OF THE INVENTION

The present invention is predicated on the discovery that mixtures of gases of differing masses can be separated at high differential flow rates by an enhanced diffusion technique involving the oscillation of gases within one or more ducts or capillaries in the presence of axial concentration gradients.

Figure 1:
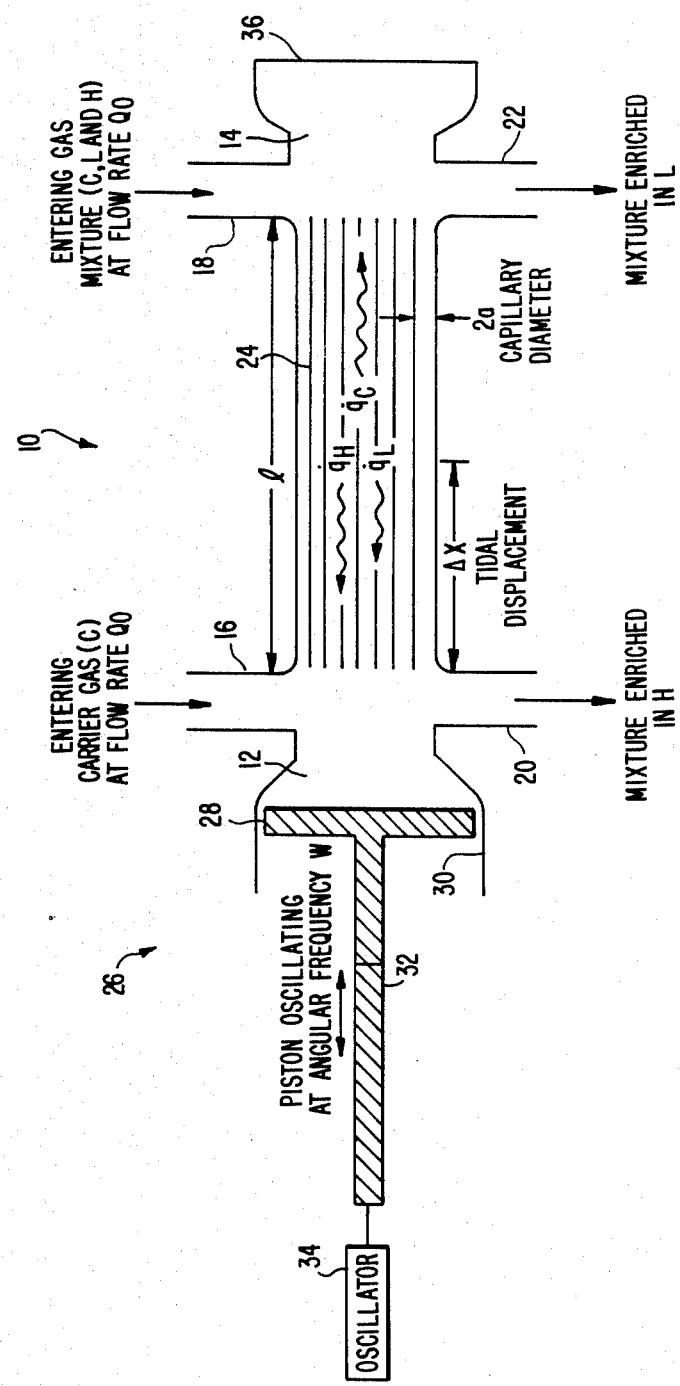
FIG. 1 is a diagrammatical sectional view of an embodiment of a diffusion cell system according to the invention.

Referring to FIG. 1, a gas separation device 10 in accordance with the invention includes a pair of gas reservoirs 12 and 14, equipped with gas inlets 16 and 18, respectively, and gas outlets 20 and 22, respectively.

The two reservoirs 12 and 14 are connected by at least one, and preferably a plurality, of ducts 24. The ducts 24 preferably have a diameter of from about 1 mm to about 4 mm.

The reservoirs 12 and 14 and the ducts 24 are adapted to receive and hold and transfer gas, respectively.

Acting on gas between the reservoirs 12 and 14, in this example, within reservoir 12 is an oscillatory displacement device 26. As a representative example, the oscillatory displacement device 26 comprises a driving piston 28 reciprocating within a cylindrical bore 30 in direct communication with the reservoir 12 and driven via a shaft 32 by an external mechanical oscillator 34. Typically, the driving piston 28 oscillates sinusoidally, however, any suitable oscillation wave form may be used.

Since the gas is substantially incompressible, in order to keep the system entirely filled at all times with no voids or dilutions of the gas mixture, a displacement accommodating device 36 is connected to reservoir 14. In the example shown, the displacement accommodating device comprises what may be viewed as a passive resilient member, preferably a membrane.

With this arrangement, as the piston 28 oscillates, gas moves alternately axially in opposite directions within the ducts 24. The displacement accommodating member 36, due to its resilient nature, returns energy to the driving piston 28. The oscillation amplitude is selected such that the extent of gas movement within the ducts 24 is less than one-half of the length of the ducts.

Figure 2:
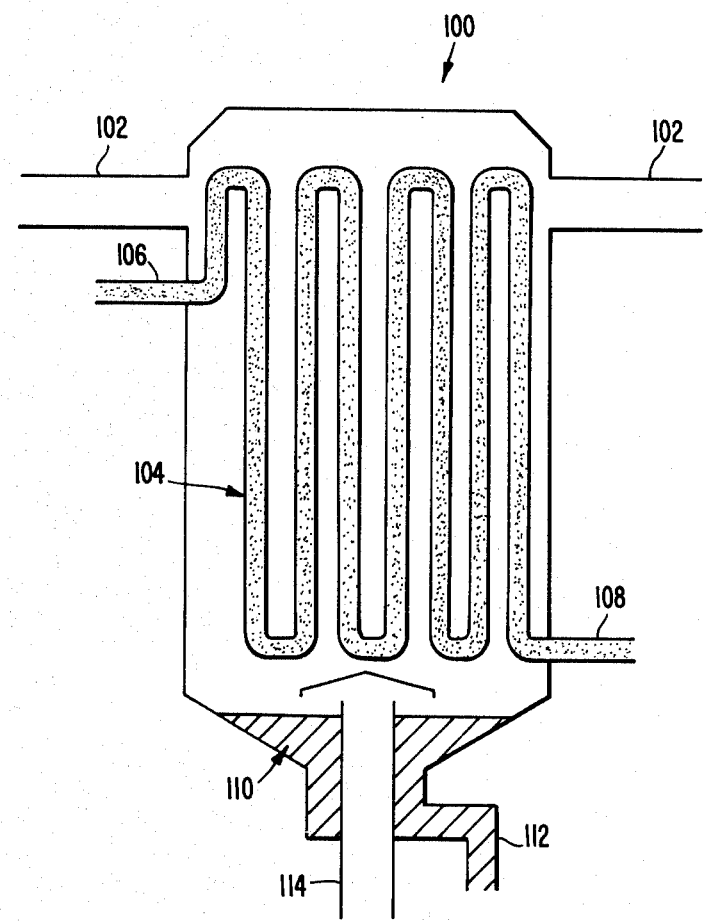
FIG. 2 is a diagrammatical sectional view of a carrier gas condenser for the system of the invention.

Referring to FIG. 2, a typical condenser 100 is shown which is capable of partially removing the carrier gas from gas mixtures entering therein through inlets 102 by having it condense along condenser plates 104, cooled by a coolant entering via inlet 106 which exits the system via outlet 108 and collecting in liquid form 110 at the bottom of the condenser. The condensed liquid may be withdrawn via outlet 112. The resultant gas mixture depleted in carrier gas is withdrawn by outlet 114 at the condenser tank bottom. This condenser could also be replaced by a chemical absorption system which can remove the carrier gas as effectively as a condenser.

Figure 3:
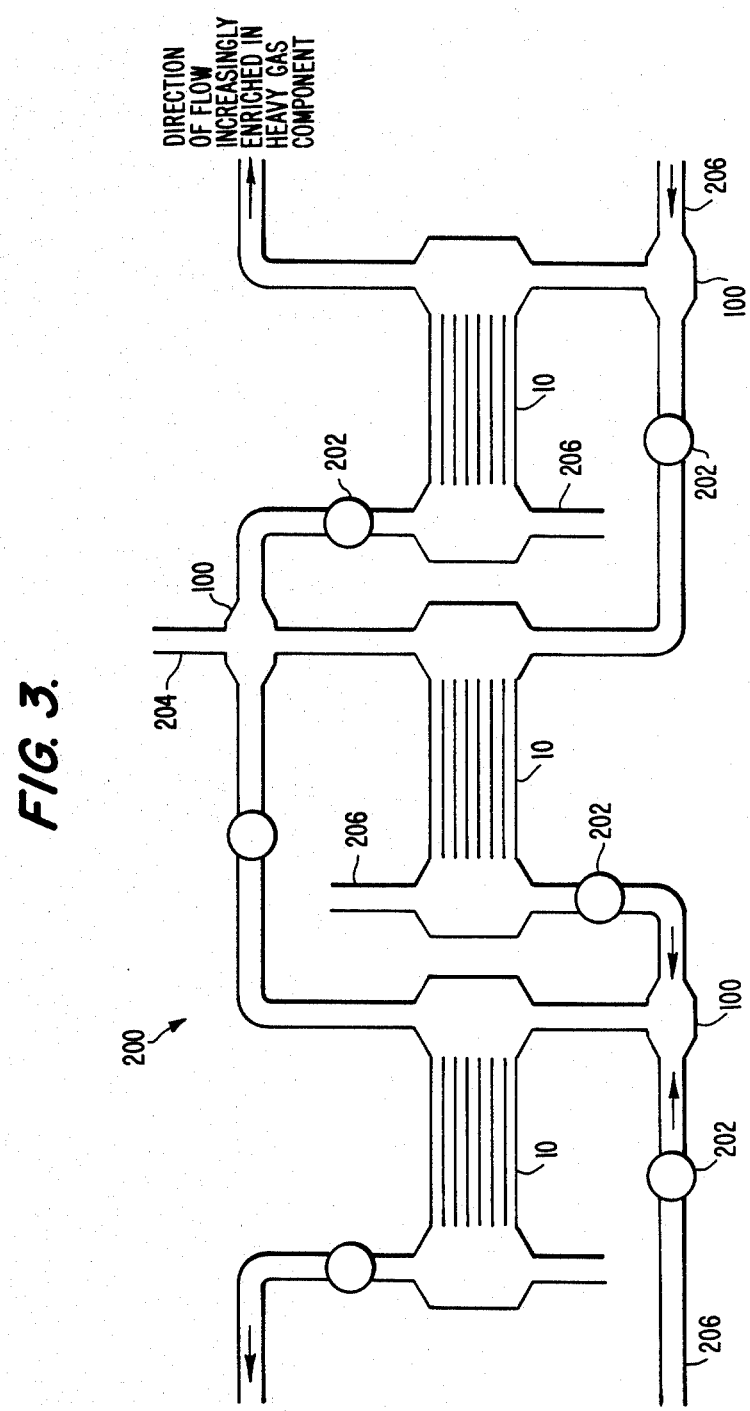
FIG. 3 is a diagrammatical sectional view of a cascade system of the invention.

Referring to FIG. 3, a standard Hertz cascade cycle 200 is shown which can be used to produce an essentially complete separation of the gas components of a mixture. The cycle consists of three basic elements: diffusion tubes 10, condensers 100 and pumps 202. The gas mixture to be separated enters the system via injection port 204. Carrier gas enters via ports 206. In the system shown the light gas component diffuses faster down the diffusion cells 10 from right to left than does the heavy gas component. As a result the mixture exiting the left of each diffusion cell is enriched with the lighter species, while the mixture exiting the right side of the diffusion cell is enriched with the heavier molecules. The function of the condenser is to remove carrier gas periodically, while the pumps insure that there is no net convection flowing along the diffusion cells and that enriched gas mixtures are moved to the next stage.

It is believed that the principles, operation and exemplary embodiments of the invention, will all be understood from the foregoing. Following is a detailed decription of an embodiment of a method of the invention.

Referring again to FIG. 1, the gas at the injection port 16 is essentially 100% carrier gas (C) while the mixture at the injection port 18 is a gas mixture composed of the light (L) and heavy (H) molecules to be separated together with a small amount of carrier gas. Preferably, the same amount of continous flow which enters the injection ports is withdrawn through ports 20 and 22 so that there is no convection flow along the tube bundle. The only gas exchange possible along the tubes is that produced by diffusion. If the piston oscillator, 26 is actuated to produce an axial periodic motion of the gas within the tube bundle, the effective axial diffusion can be made orders of magnitude larger than in the absence of oscillations. If the analytical results for such an enhanced diffusion process are examined it becomes clear that mass additives to a carrier fluid should diffuse at different rates down the tubes. The differential rate of migration depends on many parameters and, the diffusional flow rate of the light gas component (L) will be largest at or near the tuning point $a^2 f = (\frac{1}{2})D_m$, where a is the individual tube radius, f the oscillator frequency and $D_m$ the molecular diffusion coefficient of the light gas component under consideration. Typically, the frequency of oscillations will lie in the range of $f=5$ Hz to $f=30$ Hz. The diffusional flow of H can be either larger or smaller than that for L depending on the choice of tube radius and oscillator frequency. There is even a point for which no separation occurs. Very good separation will be accomplished when running at an oscillator frequency tuned for the L component. At the same time separation can also be achieved at smaller $\alpha = a\sqrt{2\pi f/v_c}$, where $v$ is the kinematic viscosity of the carrier gas. In this latter case the H molecules will actually diffuse faster down the tubes than does the L gas component. Experimental results, obtained with an apparatus similar to that shown in FIG. 1, after replacing the inlet 18 and exit 22 by a 20 liter box, have confirmed the ability of the present oscillatory approach to separate gas components. Using oxygen as the carrier gas, with about 10% each of helium and carbon dioxide added as the components to be separated, gave separation factors of $p=0.6$ at $\alpha=2$. See Eq. (3) below for the definition of $p$.

EXAMPLE

Referring to FIG. 1, pure carrier gas (C), is injected into reservoir 12 through inlet 16. At inlet 18, a mixture of carrier gas and the mixture of light (L) and heavy (H) gases are injected into reservoir 14. In reservoir 12, the gas consists of almost pure carrier gas with a small amount of the L and H components which have diffused from reservoir 14 side of the capillaries 24. The injection flows on both sides are continuous and held at the same constant value of $Q_o$, as are the withdrawal rates through outlets 20 and 22. The piston oscillator 26 sets the gases within the capillaries into sinusoidal axial motion at angular frequency but the tidal displacement $\Delta x$ is always kept sufficiently small so that a condition of zero net convection between the capillary ends is maintained. The time averaged axial diffusion flow rate of the L and H species to be separated, under these conditions, is $$\dot{q}_{L,H} = (D_{eff})_{L,H} A_o [c_{L,H}(1) - c_{L,H}(2)]/l, \qquad (1)$$

with $c_{L,H}(1)$ and $c_{L,H}(2)$ representing the concentrations in reservoirs 14 and 12, respectively, l the capillary length, $A_o$ the total capillary bundle cross-section and $D_{eff}$ the effective diffusion coefficient. The corresponding differential diffusional flow rate, directly obtainable from Eq. (1), is $$\Delta q = q_H - q_L = Q_o N \left[ \frac{c_H(1)}{N+\Gamma} - \frac{c_L(1)}{N+1} \right]/l, \text{ where } N = \quad (2)$$

$[(D_{eff}) \, lA_o/Q_o] = c_L(2)/[c_L(1) - c_L(2)]$ and $\Gamma = (D_{eff})_L/(D_{eff})_H$.

Gas component separation will occur whenever $\Gamma$ is different from unity, while the separation flow $\Delta q$ may be either positive or negative depending upon the values of N, $\Gamma$ and $c_{L,H}(1)$.

Corresponding to the above diffusion flow rates, the separation factor for the light species is $$\rho_L = \frac{c_L(2) \, c_H(1)}{c_L(1) \, c_H(2)} = \frac{N+\Gamma}{N+l}. \quad (3)$$

This quantity has values greater than one when $(D_{eff})_L > (D_{eff})_H$ and less than one when the inequality is reversed. No separation occurs when $\rho_L = 1$.

Figure 4:
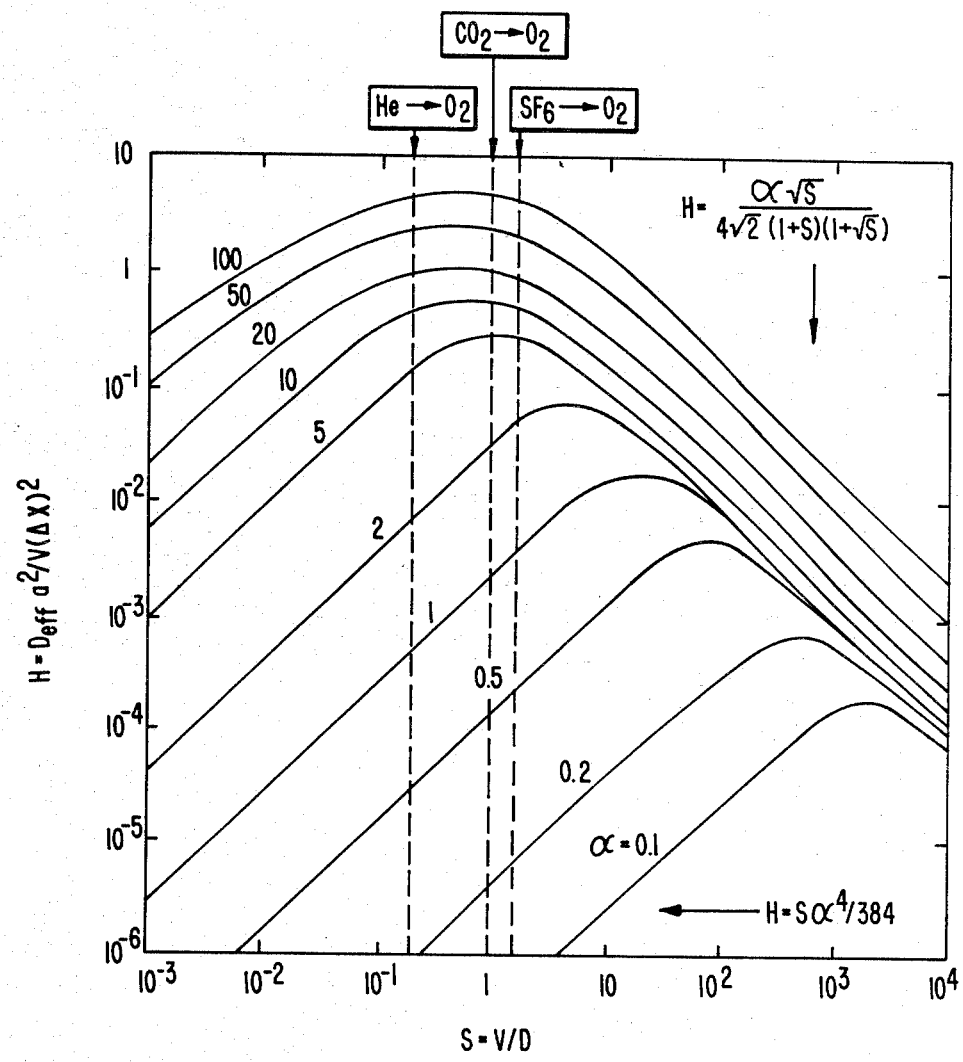
FIG. 4 is a graphical depiction of the results of a method according to the invention.

The value of the effective diffusion coefficient, $D_{eff}$, may be determined from existing theory for contaminant dispersion in pipes provided one makes the restriction that one is dealing with dilute mixtures where the flow hydrodynamics is essentially controlled by the properties of the carrier gas while the diffusion of the L and H additives into C is assumed to be independent of each other. Such an assumption is reasonable for gas mixtures where the carrier has large concentrations compared to the L and H components and leads, after neglecting direct axial diffusion and assuming laminar conditions, to the result $$D_{eff} = \nu(\Delta x/a)^2 H(\alpha, S), \quad (4)$$

where a is the radius of the individual capillaries, $\nu$ the kinematic viscosity of the carrier, $\Delta x$ the gas tidal displacement and $$H(\alpha, S) = \quad (5)$$

$$\frac{aS}{4(S^2-1)} \left[ \frac{F_I(\alpha) - \frac{1}{\sqrt{S}} F_I(\alpha \sqrt{S}) \frac{|(F(\alpha)|^2}{|(F(\alpha \sqrt{S})|^2}}{\left|1 + \frac{2}{\alpha} F(\alpha)\right|} \right]$$

with the complex function $$F + F_R + iF_I = i \left[ \frac{ber'\alpha + ibei'\alpha}{ber\alpha + ibei\alpha} \right] \quad (6)$$

related to the Kelvin functions $J_0(i^{3/2}\alpha) = ber + ibei\alpha$ whose tabulation may be found in the NBS Handbook of Mathematical Functions. The function $H(\alpha, S)$ can be derived and has the advantage that derivatives no higher than the first of the Kelvin functions are required. The results of a computer evaluation of Eq. (5) are given in FIG. 4 which depicts effective diffusion coefficients as a function of molecular diffusion coefficients for several different values of the Womersley number $\alpha = a\sqrt{\omega/\nu}$. The quantity S used in the abscissa represents a modified Schmidt number equal to the ratio of the kinematic viscosity of the carrier gas to the binary molecular diffusion coefficient D of the particular species diffusing into the carrier. The value of S for gas mixtures range from about $S=0.1$ for light molecules diffusing into a low $\nu$ carrier gas to about $S=10$ for heavy molecules diffusing into a high $\nu$ carrier. Using standard formulas [Bird et al, *Transport Phenonema* (John Wiley & Sons, N.Y., 1960) pp. 17, 503–505] for $\nu$ and D based on critical temperature and pressure and molecular weight, one finds at 300° K., that $S=0.2$ for He into $O_2$, $S=1.0$ for $CO_2$ into $O_2$ and $S=1.6$ for $SF_6$ into $O_2$. According to FIG. 4, good separation of gas components should be possible whenever the absolute value of $\partial H/\partial S$ is large and values of S differ between the constituents to be separated. No separation will occur where $\partial H/\partial S$ is zero or when $S_L = S_H$. As seen from Eq. (2), a maximum in the differential diffusion flow rate can be expected for $N=\sqrt{\Gamma}$, whenever $c_L(1) = c_H(1)$.

Figure 5:
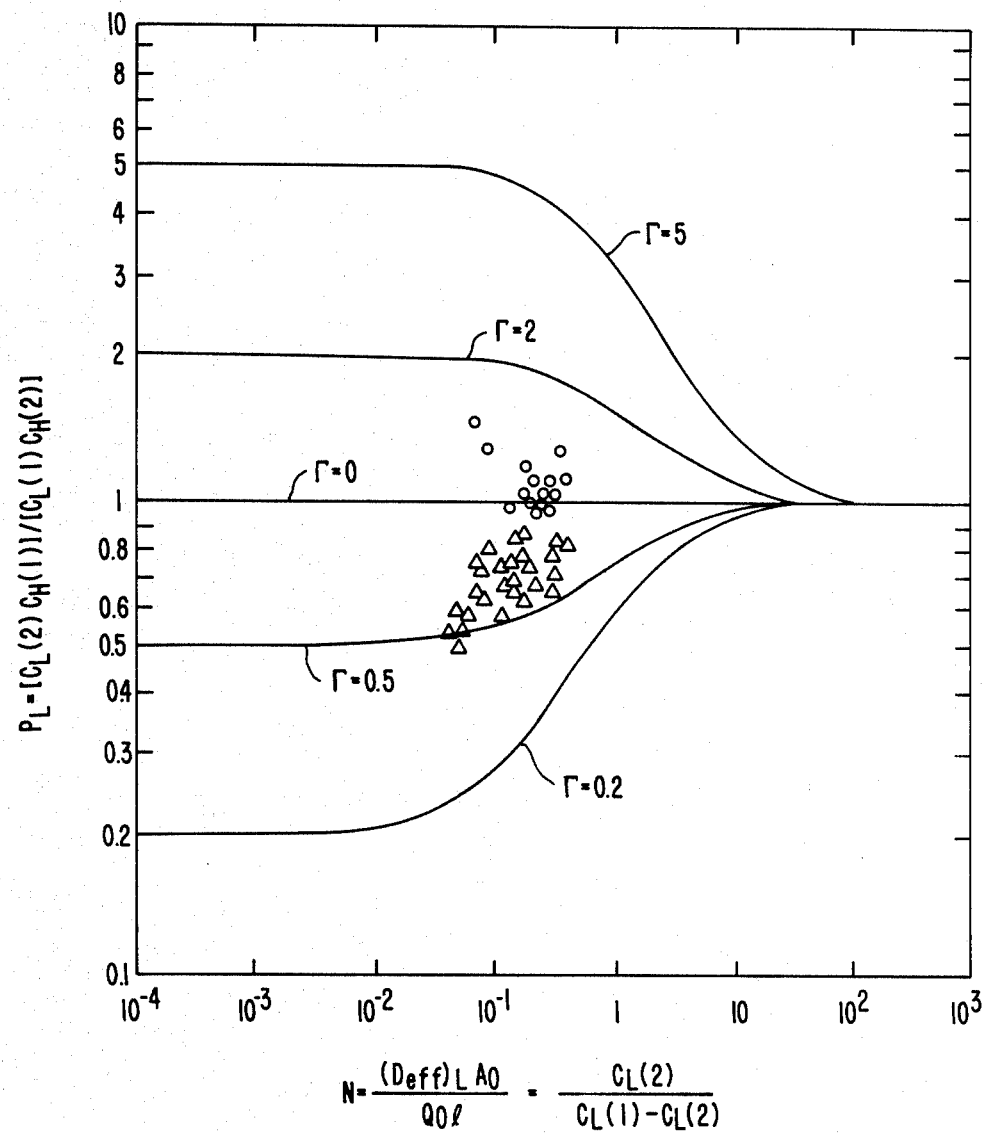
FIG. 5 is a further graphical depiction of the results of a method according to the invention.

The following specific example was carried out using a system substantially identical to that shown in FIG. 1, except that reservoir 14 was replaced by a large 20 liter hermetically sealed box into which specified gas mixtures could be placed. Although this geometry allows only quasisteady separation to be carried out, it has the advantage that changes in box pressure can be used directly to insure that no convection flow exists in the diffusion cell during the course of an experiment. Oxygen was chosen as the carrier gas. The injection flow rate of the $O_2$ carrier at entry port 16 was maintained at $Q_o = 8$ cc/sec. Moreover, a suction pump (not shown) is located at exit port 20. The oscillation frequencies used in these experiments ranged from 2 to 27 Hz and the tidal displacements from 4 to 30 cm. Two sets of capillary tubes having $a=0.05$ cm, $A=2.8$ cm², $l=34$ cm and $a=0.1$ cm, $A_o=2.8$ cm, $l=86.5$ cm were used. In addition, a single rigid tube with $a=0.79$ cm, $A_o=2.0$ cm, $l=140$ cm was also employed. In none of the runs was $\Delta x$ made larger than $\frac{1}{2}$ of the tube length in question. For the gas mixture to be separated combinations of $CO_2$-He and $CO_2$-$SF_6$ were chosen since these combinations have a large molecular weight difference and also their concentration is readily measurable with readily available equipment. Results of some 40 readings on gas separation with these gas mixtures are recorded in FIG. 5 as $\rho_L$ versus N. FIG. 5 depicts separation factor as a function of effective diffusion coefficient. The triangles represent $CO_2$-He mixtures and the circles, $SF_6$-$CO_2$ mixtures. The average carrier concentration was $C_c = 0.8$ or greater. The solid curves represent an evaluation of Eq. (3) for different values of $\Gamma$. The range of Womersley number used for both mixtures was from $\alpha=0.5$ to $\alpha=12$. The results clearly show that partial separation has been achieved, with the He-$CO_2$ results clustering about an average value of $\Gamma=0.6$ and the $CO_2$-$SF_6$ results around $\Gamma=1.2$. A comparison with the analytical result given by Eq. (3) and plotted in FIG. 5 for several different values of $\Gamma$ clearly shows that the experimental results are in good qualitative agreement with theoretical predictions but yield somewhat lower separation values, especially for He-$CO_2$ mixtures. Part of this discrepancy is believed due to the use of carrier gas concentrations as low as $c_C(1) = 0.6$, needed to keep the values of $C_L(2)$ and $c_H(2)$ above 0.01 but in violation of the assumption concerning dilute mixtures. For He-$CO_2$ mixtures the best separation was observed to occur near $\alpha = 1$ and no separation was found above $\alpha = 8$. This is in agreement with the values for $\partial H/\partial S$ shown in FIG. 4. The best separations for $CO_2$-$SF_6$ mixtures occurred for $\alpha > 10$ and these were characterized by diffusion rates for $CO_2$ greater than those for $SF_6$. A large reversal of this diffusion behaviour in $CO_2$-$SF_6$ mixtures was not observed as $\alpha$ was brought down to values as low as $\alpha = 0.5$, although theory would have predicted such a reversal. A final interesting observation deals with the differential diffusion flow rate predicted from Eq. (2) by using measured values from the data shown in FIG. 5. Taking for example the point at $\rho L = 0.65$ and $N = 0.3$ for the He-$CO_2$ mixture, where $\Gamma$ is 0.6 and for which the concentrations at 1 were $c_L(1) = c_H(1) = 0.2$, one finds via Eq. (2), that $\Delta \dot{q} = 0.25$ cc/sec. This compares with the value of $\Delta \dot{q} = -0.0026$ cc/sec which would be expected for the same mixture and conditions in the absence of oscillations in the same length tube. It is this ability of oscillations to increase the differential diffusion flow rates by several orders of magnitude which makes separation technique of the invention highly advantageous and efficient.

The above example shows that sinusoidal oscillations may be used to produce component separations of gas mixtures at much higher separation flow rates than in the absence of oscillations. Separation factors as low as $\rho L = 0.5$ were produced for He-$CO_2$ mixtures and as high as $\rho L = 1.5$ for $SF_6$-$CO_2$ mixtures in a single path through one diffusion cell. To obtain essentially complete separation it would be necessary to conduct the process in cascade fashion in which several diffusion cells are coupled together as shown in FIG. 3. Also, there would be need for the periodic removal of carrier gas in the enriched and depleted portions of the gas mixtures leaving the exit ports of the individual diffusion cells by, for example, the condensers shown in FIGS. 2 and 3. Carrier gases such as steam or $CO_2$ would be likely candidates for practical applications of the separation process of the invention as these gases can be readily condensed or removed by chemical means. Finally, it should be pointed out that the present separation process works best for relatively large values of $\Delta_\chi$ (and hence of l ) and is not very effective as l becomes small, where direct axial molecular diffusion will dominate.

The oscillation approach of the present invention using tuned conditions yields diffusion flow rates much higher than possible by the steady-flow method described by Paiva. The effective diffusion coefficients, as described in column 5 of U.S. Pat. No. 4,166,727, are about 4 cm$^2$/sec while those obtained herein are easily above 1000 cm$^2$/sec and more. The oscillation approach is a continuous flow process not involving switching devices as necessary in the Paiva diffusion method.

The oscillation approach uses short capillary tubes (less than 1 meter long) at oscillating frequencies greater than the 5 Hz. Paiva requires tubes of 10 meters (~33 ft.) length.

We claim:

1. A method for separating gases of differing masses from a gas mixture by diffusion comprising conducting at least one cycle of:

feeding a mixture of carrier gas and said mixture of gases of differing masses into a gas reservoir which is connected by at least one duct to another gas reservoir, the space defined by said gas reservoirs and said at least one duct being further undivided;

feeding said carrier gas into said other gas reservoir;

establishing oscillatory axial movement of gas within said at least one duct;

withdrawing from one of said gas reservoirs a mixture of carrier gas and a gas mixture of differing masses enriched in the heavier gas component thereof; and withdrawing from the other of said gas reservoirs a mixture of carrier gas and a mixture of gases of differing masses enriched in the lighter gas component thereof.

2. The method of claim 1 wherein said reservoirs are corrected by a plurality of ducts.

3. The method of claim 1 wherein said oscillatory axial movement is sinusoidal and tuned to maximize diffusion of one of the components of the gas mixture.

4. The method of claim 1 comprising removing at least a portion of carrier gas from at least one of said withdrawn gas mixtures.

5. The method of claim 4 wherein said carrier gas is removed by condensation.

6. The method of claim 1 comprising conducting multiple said cycles in cascade fashion wherein at least one of said mixtures of carrier gas and gas mixture enriched in one of said heavier or lighter components thereof withdrawn from a gas reservoir in a previous cycle is fed into a gas reservoir in a subsequent cycle whereby each succeeding withdrawn mixture is more enriched in said lighter or heavier component than the previously withdrawn mixture.

7. The method of claim 6 wherein at least a portion of carrier gas is removed from at least one of said withdrawn gas mixture.

8. The method of claim 7 wherein said carrier gas is removed by condensation.

9. The method of claim 1 wherein said gas is alternately moved axially in opposite directions within said at least one duct, that extent of movement therewithin being less than the length thereof.

10. The method of claim 1 wherein the rates of feeding and withdrawal of said gases and gas mixtures are equal.

11. The method of claim 1 wherein the tidal displacement in said at least one duct is maintained sufficiently small so as to maintain a condition of zero net convection between the ends of said at least one duct.

12. A system for separating gases of differing masses from a mixture thereof by enhanced diffusion comprising at least one gas separating device comprising:

a pair of gas reservoirs, each having gas inlet and outlet means;

at least one duct connecting said gas reservoirs, the space defined by said pair of gas reservoirs and said at least one duct being further undivided; and means for establishing oscillatory axial movement of gas within said at least one duct;

one of said inlet means being adapted for feeding into one of said reservoirs a mixture of a carrier gas and said mixture of gases of differing masses;

the other of said inlet means being adapted for feeding a carrier gas into the other of said reservoirs;

one of said outlet means being adapted for the withdrawal from one of said reservoirs a mixture of carrier gas and a mixture of gases of differing masses enriched in the heavier gas component; and the other of said outlet means being adapted for the withdrawal from the other of said reservoirs a mixture of carrier gas and a mixture of gases of differing masses enriched in the lighter gas component.

13. The gas separation system of claim 12 comprising a plurality of said ducts connecting said gas reservoirs.

14. The gas separation system of claim 12 wherein said means for establishing oscillatory axial movement establishes a sinusoidal movement.

15. The gas separation system of claim 12 wherein at least one of said outlet means is connected to means for removing at least a portion of said carrier gas from said withdrawn gas mixture.

16. The gas separation system of claim 15 wherein said means for removing carrier gas is a condenser.

17. The gas separation system of claim 12 comprising multiple said gas separating devices connected in cascade fashion such that at least one of said mixtures of carrier gas and gas mixture enriched in one of said lighter or heavier components thereof withdrawn from a reservoir of a previous gas separating device is fed into a reservoir of a subsequent gas separating device, whereby each succeeding withdrawn mixture is more enriched in said component than the previously withdrawn mixture.

18. The gas separation system of claim 17 wherein said outlet means of at least one of said multiple gas separating devices is connected to means for removing at least a portion of said carrier gas from said withdrawn gas mixture.

19. The gas separation system of claim 18 wherein said means for removing said carrier gas is a condenser.

20. The gas separation system of claim 12 wherein said means for establishing oscillatory axial movement of gas within said at least one duct comprises an oscillatory displacement device acting an gas within one of said reservoirs for causing gas to alternately move axially in opposite directions within said at least one duct, the extent of gas movement therewithin being less than the length thereof.

21. The gas separation system of claim 20 wherein the other of said reservoirs contains a displacement accommodating device acted on by the gas contained therein.

22. The gas separation system of claim 21 wherein said displacement accommodating device comprises a passive resilient member.

23. The gas separation system of claim 22 wherein said passive resilient member is a membrane.

* * * * *

UNITED STATES PATENT AND TRADEMARK OFFICE
CERTIFICATE OF CORRECTION

PATENT NO. : 4,770,675
DATED : September 13, 1988
INVENTOR(S) : Ulrich H. KURZWEG, ET AL It is certified that error appears in the above-identified patent and that said Letters Patent is hereby corrected as shown below:

COLUMN 1, LINE 6, UNDER THE TITLE OF THE INVENTION, ADD THE FOLLOWING:

-- Research leading to the completion and reduction to practice of the invention was supported, in part, by Grant No. N00014-86-K0123 issued by the United States Navy. The U.S. Government has certain rights in and to the claimed invention. --

Signed and Sealed this

Twenty-third Day of November, 1993

Attest:

BRUCE LEHMAN

Attesting Officer

Commissioner of Patents and Trademarks